(12) United States Patent
Allaire

(10) Patent No.: US 8,469,124 B2
(45) Date of Patent: *Jun. 25, 2013

(54) ENDLESS BELT TENSIONER SYSTEM AND METHOD OF USE THEREOF

(71) Applicant: L'Equipe Fabconcept Inc, Chicoutimi (CA)

(72) Inventor: Marius Allaire, Chicoutimi (CA)

(73) Assignee: L 'Équipe Fabconcept Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/737,257

(22) Filed: Jan. 9, 2013

(65) Prior Publication Data
US 2013/0119754 A1 May 16, 2013

Related U.S. Application Data

(63) Continuation of application No. 12/708,430, filed on Feb. 18, 2010, now Pat. No. 8,371,402.

(60) Provisional application No. 61/202,324, filed on Feb. 18, 2009.

(51) Int. Cl.
*B62D 55/00* (2006.01)

(52) U.S. Cl.
USPC .............................. 180/9.1; 180/9.52

(58) Field of Classification Search
USPC ............ 180/9.1, 9.3, 9.52, 186, 196; 305/145
See application file for complete search history.

(56) References Cited

U.S. PATENT DOCUMENTS

| | | | | |
|---|---|---|---|---|
| 4,840,437 A * | 6/1989 | Henry et al. | ................... | 305/144 |
| 6,224,172 B1 * | 5/2001 | Goodwin | ..................... | 305/145 |
| 6,408,965 B1 * | 6/2002 | Grant | ........................... | 180/9.62 |
| 7,172,257 B2 * | 2/2007 | Tamaru et al. | ............... | 305/145 |
| 7,252,349 B2 * | 8/2007 | Livesay et al. | ................ | 305/143 |
| 7,770,984 B2 * | 8/2010 | Schmit et al. | ................. | 305/145 |
| 7,866,420 B1 * | 1/2011 | Claas et al. | .................... | 180/9.1 |
| 7,914,087 B2 * | 3/2011 | Alfthan | .......................... | 305/145 |
| 2003/0117017 A1* | 6/2003 | Hoff | ................................ | 305/143 |
| 2005/0231035 A1* | 10/2005 | Vertoni | ........................ | 305/143 |
| 2011/0005847 A1* | 1/2011 | Andrus et al. | ................. | 180/9.1 |

* cited by examiner

*Primary Examiner* — Tashiana Adams
(74) *Attorney, Agent, or Firm* — Mathieu Audet

(57) ABSTRACT

An endless belt tensioner system adapted to dynamically apply a tensioning force on a ground-contacting endless belt of a vehicle is provided, the tensioning force being managed to prevent the endless belt to disengage from an operating configuration when the suspension is actuated. A vehicle and a method of use thereof are also provided.

20 Claims, 13 Drawing Sheets

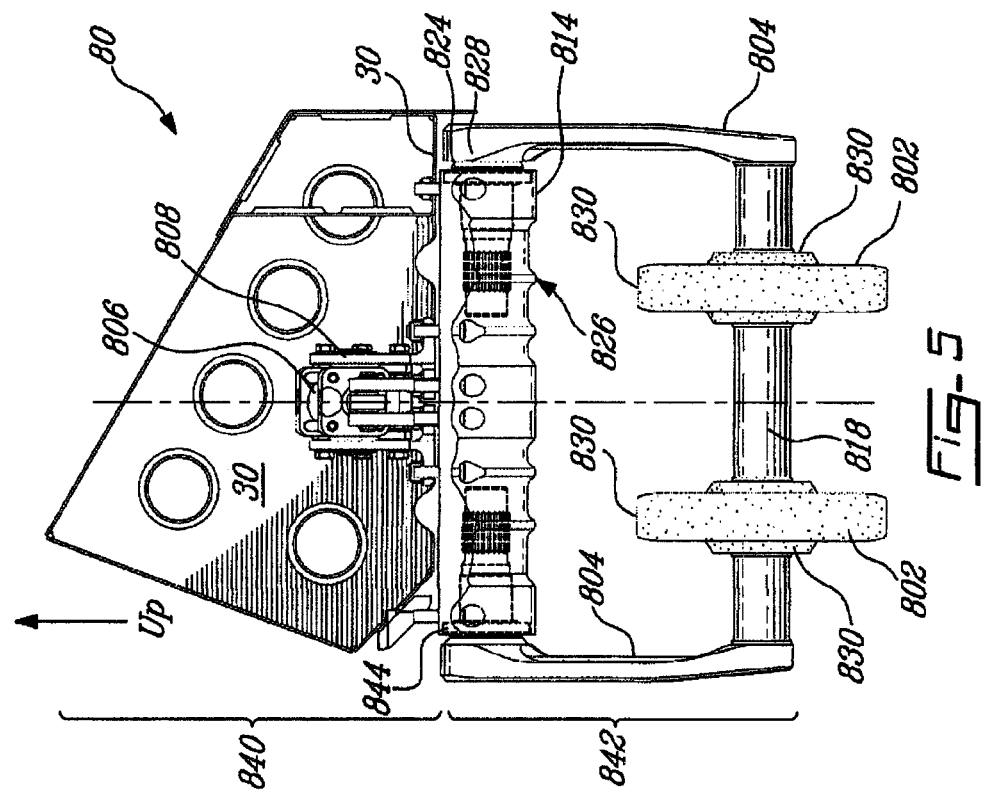
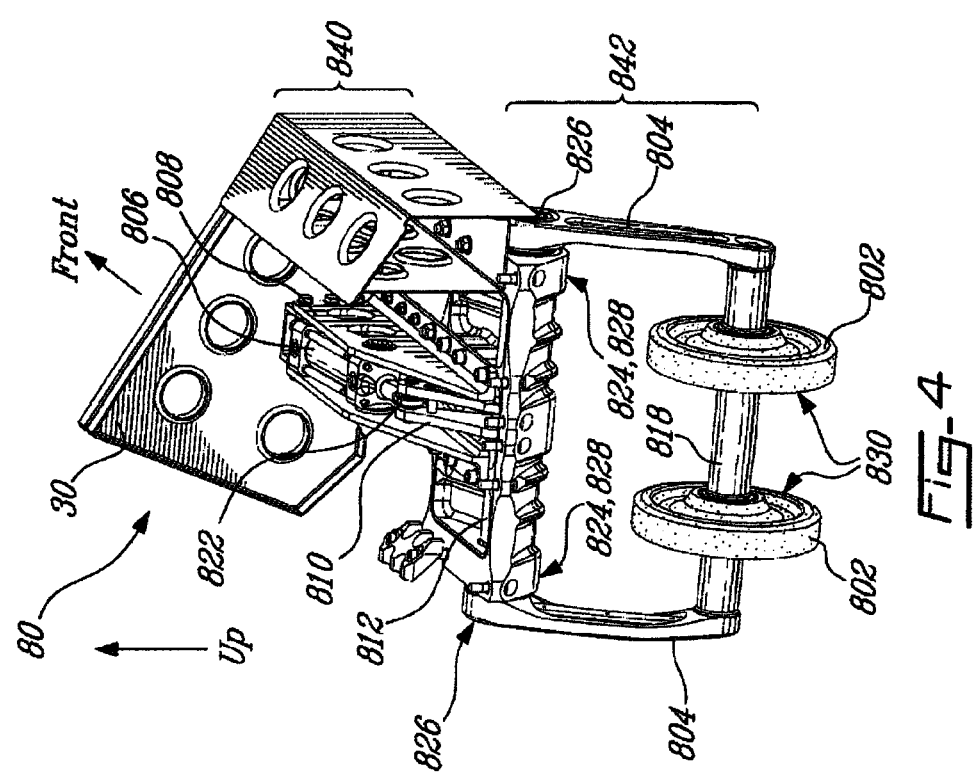

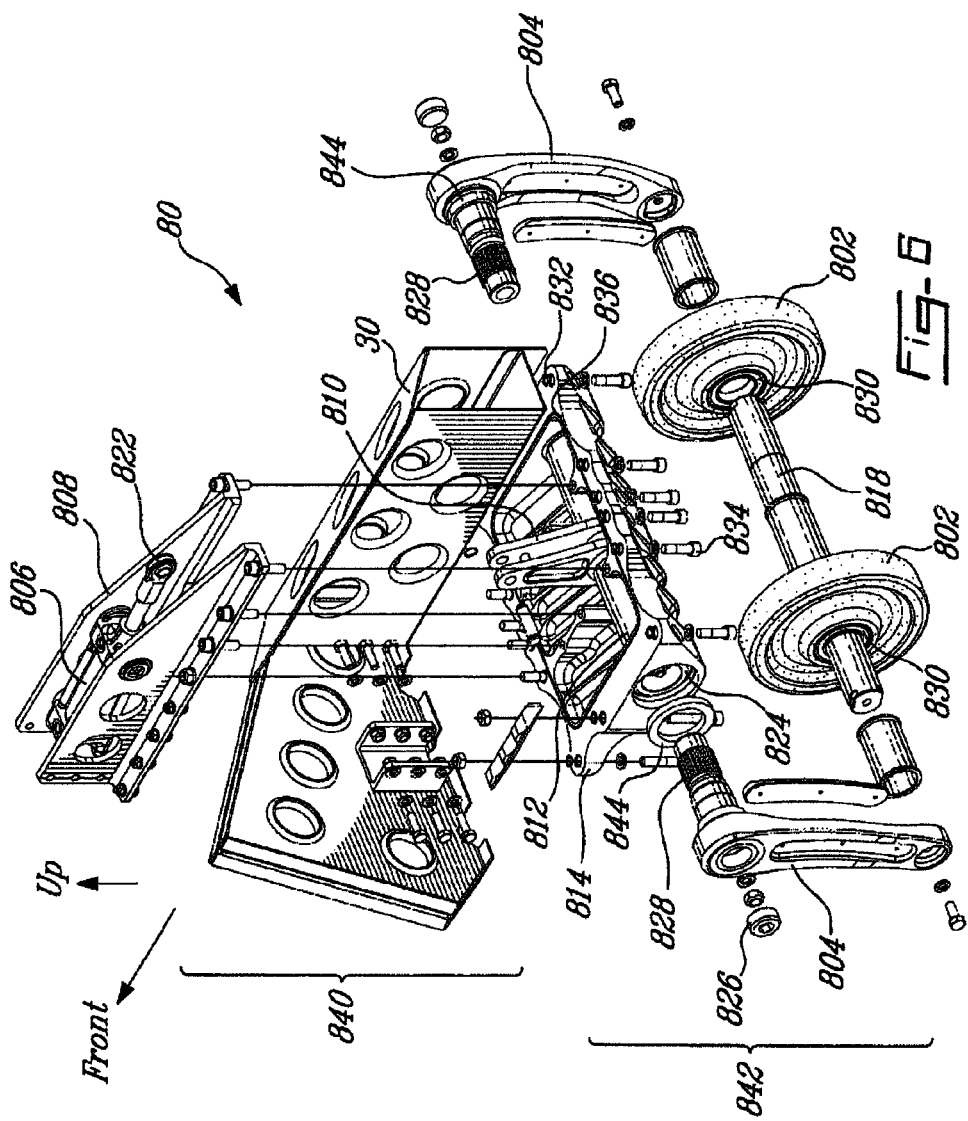

ENDLESS BELT TENSIONER SYSTEM AND METHOD OF USE THEREOF

CROSS REFERENCE TO RELATED APPLICATIONS

The present application is a continuation of, and claims priority under 35 U.S.C. 120, to U.S. patent application Ser. No. 12/708,430, filed Feb. 18, 2010, entitled ENDLESS BELT TENSIONER SYSTEM AND METHOD OF USE THEREOF, which is incorporated herein by reference its entirety, and which is a non-provisional of, and claims priority under 35 U.S.C. 119(e) to, U.S. provisional application No. 61/202,324, entitled ENDLESS BELT TENSIONER SYSTEM AND METHOD THEREOF, filed on Feb. 18, 2009, which is herein incorporated by reference in its entirety. Any publication of and any patent issuing from the foregoing U.S. patent applications are hereby incorporated herein by reference.

FIELD OF THE INVENTION

The present application generally relates to an endless belt tensioner. More precisely, the present application relates to an endless belt tensioner adapted to change the tension in the endless belt.

BACKGROUND OF THE INVENTION

Vehicles equipped with endless belt drives are adapted to be used on various types of grounds. Endless belt drives, or caterpillars, are replacing, or complementing, weight supporting wheels to reduce ground contacting pressure and improve floatation and traction on soft grounds.

Each endless belt is generally installed on a set of wheels and/or bearing members supporting and positioning the endless belt on the vehicle. At least one driven tooted wheel, commonly called a sprocket, engages the endless belt to transmit movement to the endless belt and propel the vehicle. Other optional endless belt supports can also be used to ensure proper operation of the endless belt drive.

The weight-supporting wheels are affixed to a suspension system adapted to absorb ground imperfections of rugged terrains and provide a smoother ride to occupants of the vehicle. A wide-travel suspension system generally allows the passage of significant ground obstacles. However, wide travel suspensions significantly affect the tension of the endless belt and increase the risk of disengaging the endless belt from its drive sprocket and/or coming off its weight supporting wheels. Significant tension in the endless belt also has an effect on the useful life of the endless belt.

A need, therefore, exists for an improved tensioner system for the endless belts of all-terrain vehicles.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description of exemplary embodiments, which is presented later.

An endless belt tensioner system, and method of use thereof, of the present invention (including a kit therefor) may, by way of example, be exploited in relation to an all-terrain vehicle. However, the tensioner system of the present invention may be used in relation to other vehicles adapted to serve in contexts that differ from the embodiments described and illustrated hereinafter.

It is to be understood herein that the term all-terrain vehicle generally refers to an off-road vehicle although the vehicle could alternatively be used on the road. It is further understood that the term endless belt generally refers to a caterpillar-type drive adapted to impart motive power from the vehicle to the ground by a means that provides a wider ground footprint than a wheel. An endless belt, or a caterpillar, can be made of articulated steel parts, rubber, composite materials (woven material and rubber) or other material suitable to this end.

Therefore, one object of the present invention improves at least some of the deficiencies associated with an endless belt tensioner intended to be adapted to an all-terrain vehicle.

Another object of the present invention provides an endless belt tensioner system that offers a wide travel suspension while assisting in preventing the endless belt from coming off its proper operating position.

An object of the present invention provides an endless belt tensioner system that offers a wide travel suspension while preventing the endless belt from wearing out prematurely.

One object of the present invention provides an endless belt tensioner system that is hydraulically actuated.

An additional object of the present invention provides an endless belt tensioner system that allows high suspension travel thereof.

One additional object of the present invention provides an endless belt tensioner system that requires low maintenance and assists in preventing debris from influencing its useful life.

An additional object of the present invention provides an endless belt tensioner system that applies tension to the endless belt proportional to the traction effort applied to the endless belt.

Another additional object of the present invention provides an endless belt tensioner system that applies distinct tension to each of the endless belts in proportion with their respective traction effort.

An additional object of the present invention provides an endless belt tensioner system that applies tension to the endless belts when the vehicle moves forward and rearward.

One other additional object of the present invention provides a method of adjusting tension in endless belts in accordance with behaviors of the vehicle.

An aspect of the present invention provides an endless belt tensioner system that uses a hydraulically actuated tensioner to adjust the tension of the endless belt.

Another aspect of the present invention provides an endless belt tensioner system that uses a hydraulic shuttle valve to distribute hydraulic pressure to the tensioner system.

One aspect of the present invention provides an endless belt tensioner system that is, at least in part, disposed on the vehicle in a fashion that prevents the tensioning system from being contaminated by foreign materials.

One other aspect of the present invention provides an endless belt tensioner system of which the hydraulic portion is disposed inside the frame and the endless belt contacting wheels are disposed outside the frame and subjected to foreign material.

Another aspect of the present invention provides an endless belt tensioner system adapted to be dynamically powered by hydraulic pressure.

One another aspect of the present invention provides an endless belt tensioner system provided with a shuttle valve that hydraulically actuates the tensioner system when the vehicle moves forward and rearward.

An aspect of the present invention provides a hydraulic endless belt tensioner system that uses a drive hydraulic pressure to tense the endless belt.

An aspect of the present invention provides a hydraulic endless belt tensioner system for each side of a vehicle, each hydraulic endless belt tensioner system being hydraulically coupled with its respective hydraulic drive system.

One another aspect of the present invention provides a hydraulic endless belt tensioner system for each side of a vehicle, each hydraulic endless belt tensioner system being hydraulically coupled with the hydraulic drive system providing the higher pressure therein.

Another aspect of the present invention provides a manually actuated hydraulic endless belt tensioner system.

One aspect of the present invention provides an automatically pressure regulated hydraulic endless belt tensioner system based, at least in part, on the traction force, the speed of the vehicle, the steering angle, the longitudinal inclination of the vehicle and/or the transversal inclination of the vehicle.

An aspect of the present invention provides a hydraulic endless belt tensioner system coupled with a preloading spring providing a non-hydraulic tension preload to the endless belt.

Yet another aspect of the present invention provides, for a substantially constant hydraulic pressure, a substantially constant endless belt contacting wheels pressure over the endless belt contacting wheels displacement.

One additional aspect of the present invention provides an endless belt tensioner system adapted to apply a tensioning force on a ground-contacting endless belt of a vehicle, the tensioning force being substantially proportional to an endless belt drive force applied to the endless belt to move the vehicle.

One aspect of the present invention provides an endless belt tensioner system comprising a tensioner module adapted to physically apply tension on an endless belt of a vehicle; a vehicle behavior module adapted to determine the behaviors of the vehicle; and a tensioner management module adapted to position the tensioner module based, at least in part, on outputs provided by the vehicle behavior module.

Another aspect of the present invention provides a vehicle comprising at least a pair of ground-contacting endless belts each cooperating with a tensioning mechanism adapted to determine a tension in the ground-contacting endless belt, the tensioning mechanism increasing the tension in the ground-contacting endless belt in function of a speed of the vehicle.

Another aspect of the present invention provides a method for managing a tension of a ground-contacting endless belt on a vehicle, the method comprising sensing the hydraulic pressure in a drive hydraulic system adapted to propel the vehicle; adjusting the tension in the ground-contacting endless belt based at least in part on the sensed hydraulic pressure.

A further aspect of the present specification provides a spring mechanism that insures a minimum tension in the endless belt during vehicle operation and non-operation.

Therefore, in accordance with the present invention, there is provided an endless belt tensioner system adapted to apply a tensioning force on a ground-contacting endless belt of a vehicle, the tensioning force being substantially proportional to an endless belt drive force applied to the endless belt to move the vehicle.

Also in accordance with the present invention, there is provided an endless belt tensioner system comprising: a tensioner module adapted to physically apply tension on an endless belt of a vehicle; a vehicle behavior module adapted to determine the behaviors of the vehicle; and a tensioner management module adapted to position the tensioner module based, at least in part, on outputs provided by the vehicle behavior module.

Further in accordance with the present invention, there is provided a vehicle comprising at least a pair of ground-contacting endless belt cooperating with a tensioning mechanism adapted to determine a tension in the ground-contacting endless belt, the tensioning mechanism increasing the tension in the ground-contacting endless belt in function of a speed of the vehicle.

Still further in accordance with the present invention, there is provided a method for managing a tension of a ground-contacting endless belt on a vehicle, the method comprising:

sensing the hydraulic pressure in a drive hydraulic system adapted to propel the vehicle; and adjusting the tension in the ground-contacting endless belt based at least in part on the sensed hydraulic pressure.

Other objects, aspects, advantages and features of the present invention will become more apparent upon reading of the following non-restrictive description of embodiments thereof, given by way of example only with reference to the accompanying drawings.

BRIEF DESCRIPTION OF THE DRAWINGS

Reference will now be made to the accompanying drawings, showing by way of illustration an illustrative embodiment of the present invention, and in which:

FIG. 4 is an isometric view of the tensioner system of FIG. 3;

FIG. 5 is a rear elevation view of the tensioner system of FIG. 3;

FIG. 6 is an exploded isometric view of the tensioner system of FIG. 3;

Figure 1:
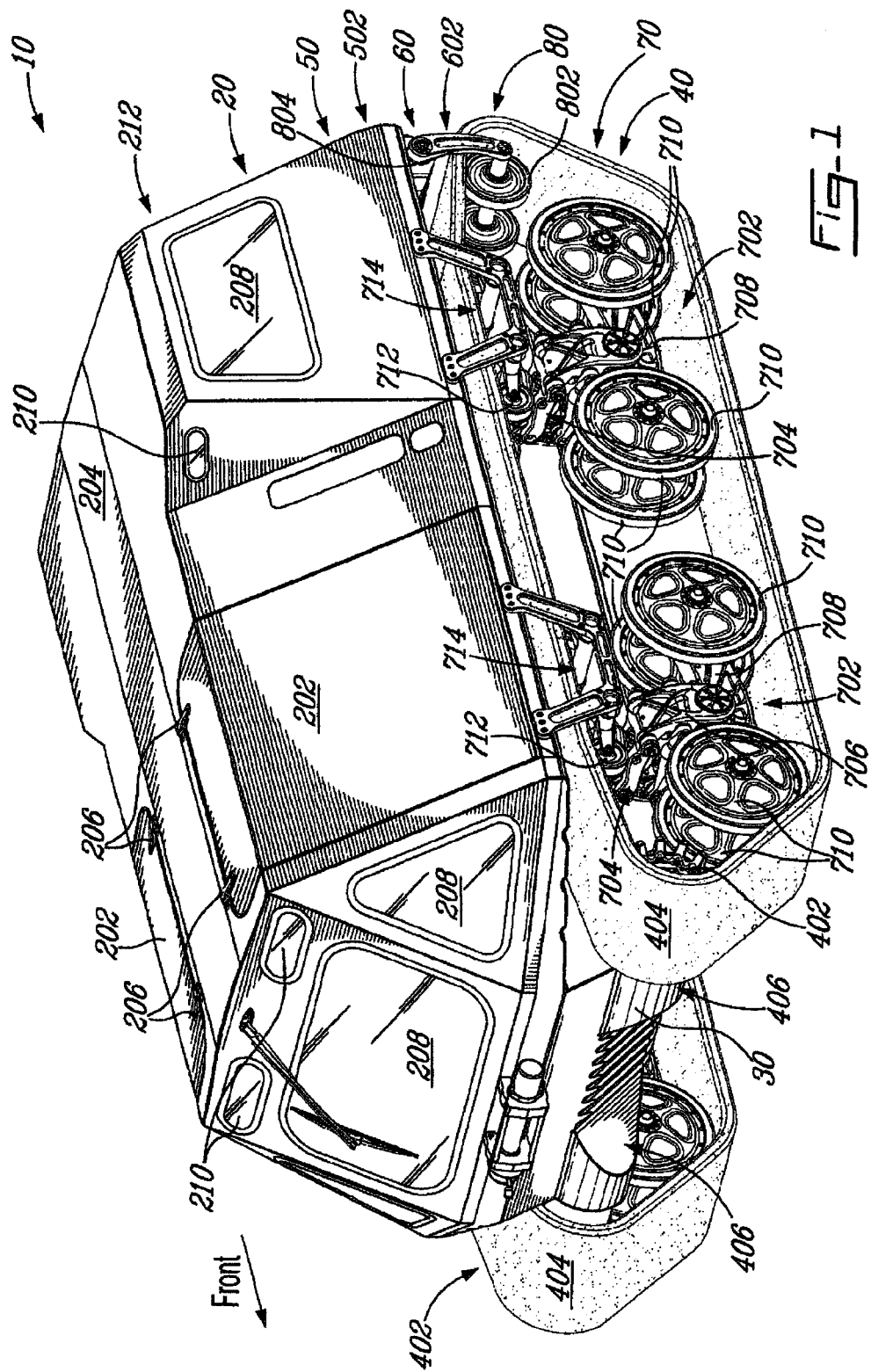
FIG. 1 is a front-right isometric view of an all-terrain vehicle.

DESCRIPTION OF ILLUSTRATIVE
EMBODIMENT(S) OF THE INVENTION

The present invention will now be described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details.

Figure 2:
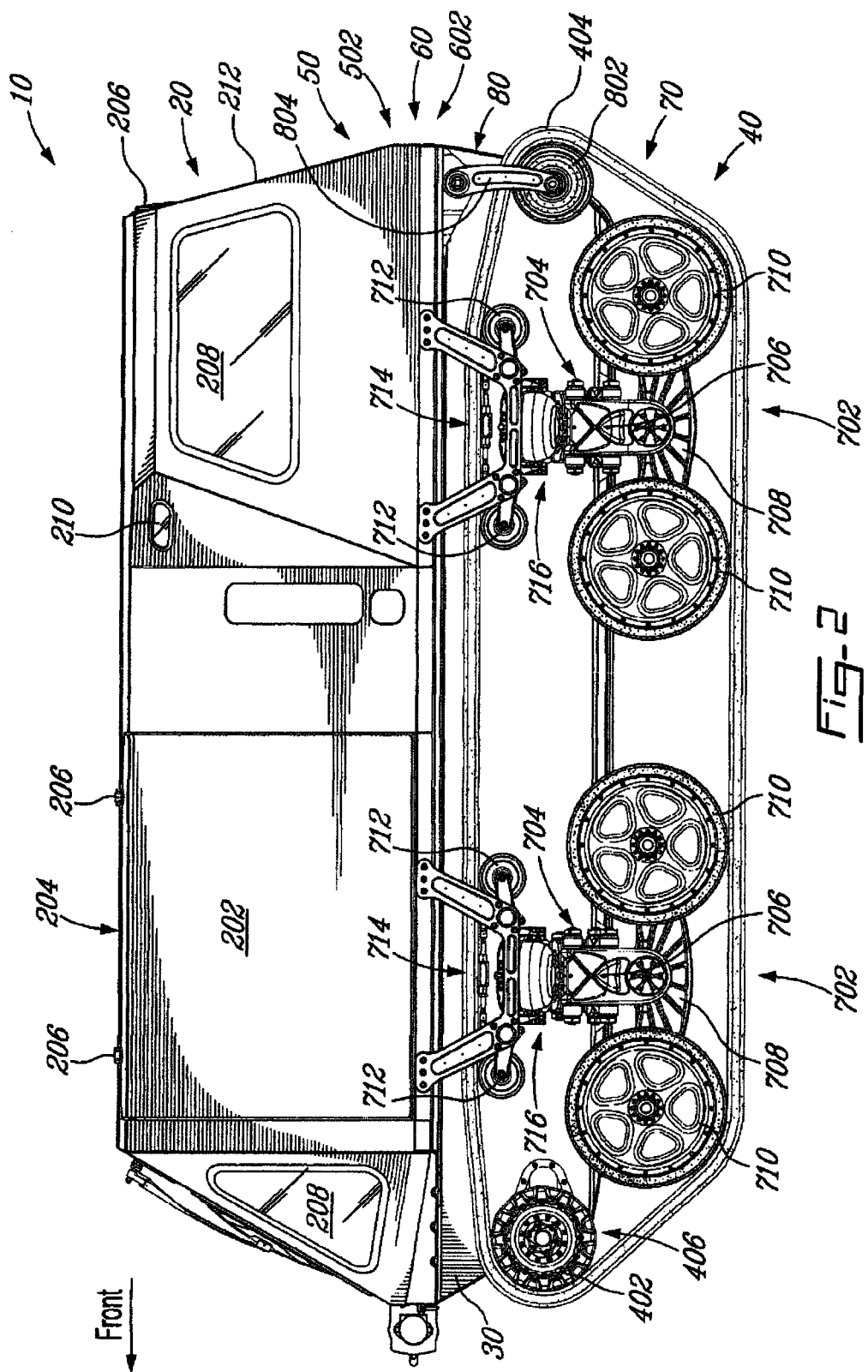
FIG. 2 is a right side elevation view of the all-terrain vehicle of FIG. 1.
Figure 3:
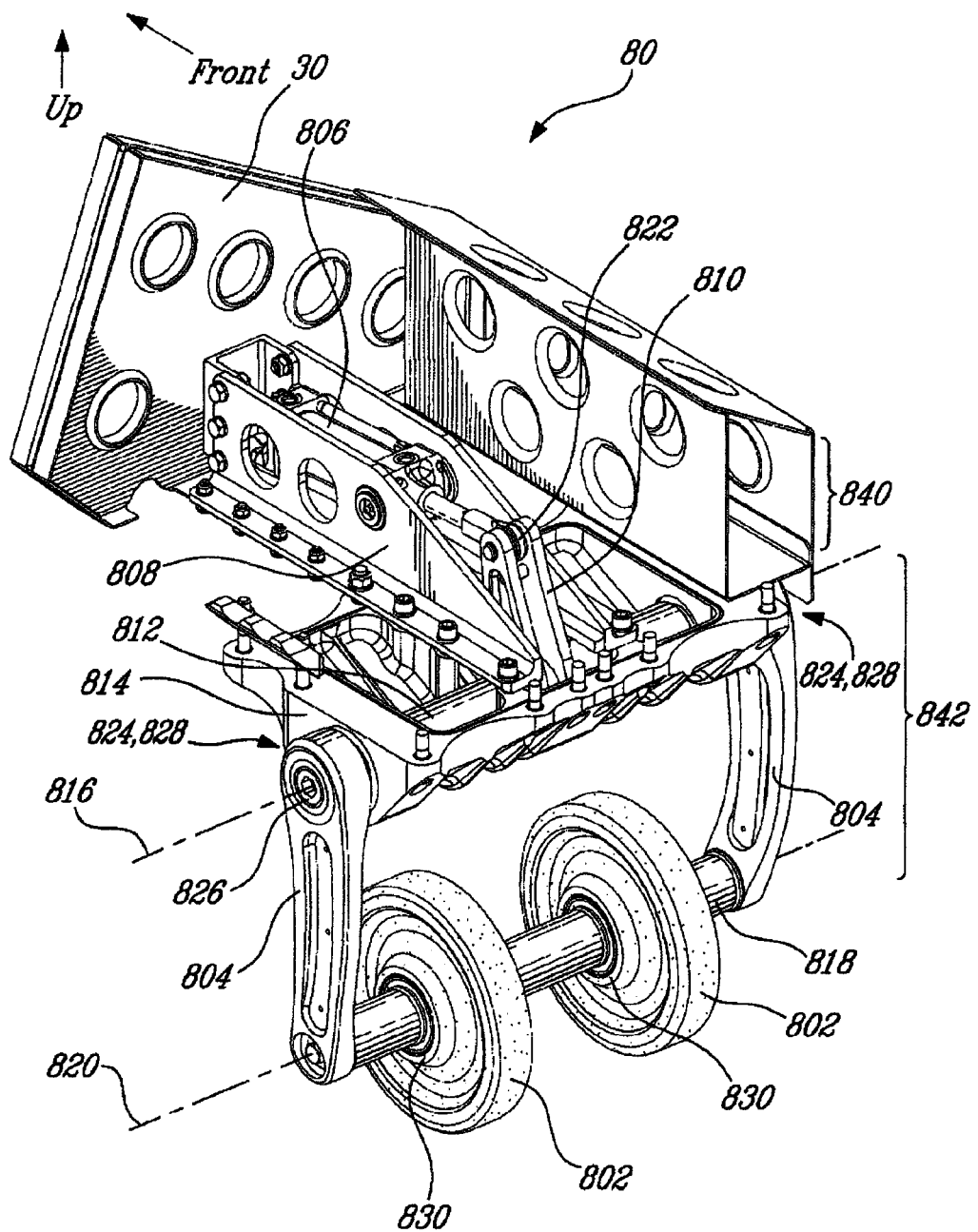
FIG. 3 is an isometric view of a tensioner system of the all-terrain vehicle of FIG. 1.

Thus, an embodiment of the invention is shown on FIGS. 1 and 2 embodied on an all-terrain vehicle 10. The all-terrain vehicle 10 is constituted, inter alia, of a passenger compartment 20, a frame 30, a drive system 40, a power pack 50, a hydraulic system 60, a suspension system 70 and a tensioner system 80. The passenger compartment 20 is provided with doors 202 pivotally secured on each side of a roof portion 204 via hinges 206, windows 208 disposed on the periphery of the vehicle 10, a back door 212 and a plurality of lights 210.

Manufacturing of the passenger compartment 20 of the illustrated embodiment is generally made in aluminum material for reasons of strength and weight. Other materials, like steel, plastic or composite materials, could be used within the scope of the present invention.

The passenger compartment 20 is mounted to the frame 30 thus forming a monocoque construction that enhances the rigidity and the strength of the overall vehicle assembly. Most parts of the vehicle assembly can be fastened, glued, welded, riveted or secured by other suitable means known in the art of vehicle manufacturing.

The power pack 50 is housed in and secured to the frame 30. The power pack 50 is preferably located low in the frame 30 to keep the center of gravity of the vehicle 10 as low as possible. Preferably, the power pack 50 is transversally centered in the vehicle 10 for reasons of lateral weight distribution. The longitudinal position of the power pack 50 can vary in accordance with the desired mass distribution and volume allocation. In this respect, the power pack 50 can be disposed in the center of the vehicle 10 to advantage mass distribution. Alternatively, the power pack 50 can be positioned toward the rear of the frame 30 to allow maximum room therein for passengers.

An internal combustion engine 502, e.g. a diesel or gas engine, powers a hydraulic system 60 via a rotating or reciprocating hydraulic pump 602. The internal combustion engine 502 could alternatively power more than one hydraulic system 60 and/or hydraulic pump 602. A plurality of hydraulic pumps 602 and/or hydraulic system 60 might be desirable for reasons of reliability if the vehicle 10 is expected to be used in extreme conditions by offering redundant systems. More than one hydraulic pump 602 also allows driving independently each endless belt 404. The pressurized hydraulic system 60 powers hydraulic motors 406 that, in turn, mechanically power the drive system 40 with drive sprockets 402. Intermediate planetary gearboxes (not shown) reduce the ratio between each hydraulic motor 406 and its associated sprocket 402. Sprockets 402 of the drive system 40 propel the vehicle 10 by engaging and turning the endless belts 404. Two hydraulic motors 406 are installed in the vehicle 10, each moving one of the two endless belts 404. The vehicle 10 is steered by a difference in rotation of the two hydraulic motors 406.

Still referring to FIG. 1 and FIG. 2, the suspension system 70 comprises a plurality of suspension units 702. Each suspension unit 702 uses a double wishbone configuration 704 coupled on a proximal side to the frame 30 of the vehicle 10 and, on a distal side, to a hub 706. The hub 706 pivotally accommodates a tandem 708 to which are rotatably secured suspension wheels 710. Support wheels 712 are provided on an endless belt upper support 714 to maintain the upper side of the endless belt 404 on its way toward the front of the vehicle 10.

Tension in each endless belt 404 is independently managed by the tensioner system 80. Endless belt contacting wheels 802 are adapted to move along the radius generated by tension lever 804 about pivot axis 816 to extend or retract the circumference of its associated endless belt 404. The tensioner system 80 is adapted to provide proper tension in the endless belt 404 by dynamically adapting to operating conditions of the vehicle 10. This aspect of the tensioner mechanism 80 will be discussed later in more details.

As better seen on FIGS. 3 through 8, it can be appreciated that the tensioner system 80 is actuated by a hydraulic cylinder 806 attached on one side to the frame 30 via an intervening cylinder support 808. The actuation of the hydraulic cylinder 806 by the hydraulic system 60 procures a desired tension to the endless belt 404 (illustrated on FIGS. 1 and 2). The hydraulic cylinder 806 is pivotally coupled on the other side (i.e. piston side), with a rod end 822, to a primary lever 810 that extends from a pivot member 812. The pivot member 812 is pivotally secured to the frame 30 by an intervening bearing support 814 adapted to receive a plurality of ball bearings 824 therein. The two levers 804 are selectively positioned and pivotally secured to the pivot member 812 at a predetermined angle thereto with splines 828 (better seen on FIG. 5) or other means to join both parts while offering angular adjustment thereof. The angular position of the levers 804 can be changed by removing the fasteners 826 securing the levers 804 and angularly repositioning the levers 804 in the splines 828. Two endless belts contacting wheels 802 are rotatably secured to a wheel support 818 (axle), defining a wheel axis 820 thereabout, abutting the levers 804 on each end thereof. Each endless belt contacting wheel 802 is provided with a ball bearing 830 arrangement to facilitate rotational movements of the endless contacting wheels 802 when the endless belt 404 rotates.

The tensioner system 80 is separated in two portions, the internal portion 840 and the external portion 842. The internal portion 840 is disposed inside the frame 30 of the vehicle 10 to protect a portion of the elements of the tensioner system 80 against dirt, sand, water and other contaminants. In contrast, the external portion 842 extends outside the frame 30 of the vehicle 10 and is therefore not protected against contaminants. The junction between the two portions 840 and 842 is made with the levers 804 that are extending outside the frame 30 by extending out of the bearing support 814. Levers 804 pivot about the pivot axis 816 to apply tension to the endless belt 404. Sealing of the interface between the internal portion 840 and the external portion 842 is performed with seals 844, which are best seen on FIGS. 6 and 7, disposed on the circular section of the levers 804. In so doing, only a portion of the levers 804 and the endless belt contacting wheels 802 are vulnerable to the environment.

It can be appreciated that the bearing support 814 is sealed to the frame 30 with a series of O-rings 832 installed on each bolt 834 securing the bearing support 814 to the frame. A gasket 836 is disposed on the periphery of the bearing support 814 to further seal the bearing support 814 to the frame 30.

Alternatively, the internal portion 840 could be defined by a casing (not illustrated) adapted to cover components assembled outside the frame 30. Such an internal portion, despite not being disposed inside the frame 30 of the vehicle 10 in this alternate embodiment, would be sealed from the environment by the casing. Seals 844 could be similarly installed on the levers 804 through the casing thus allowing pivotal movements of the pivot member 812.

Figure 7:
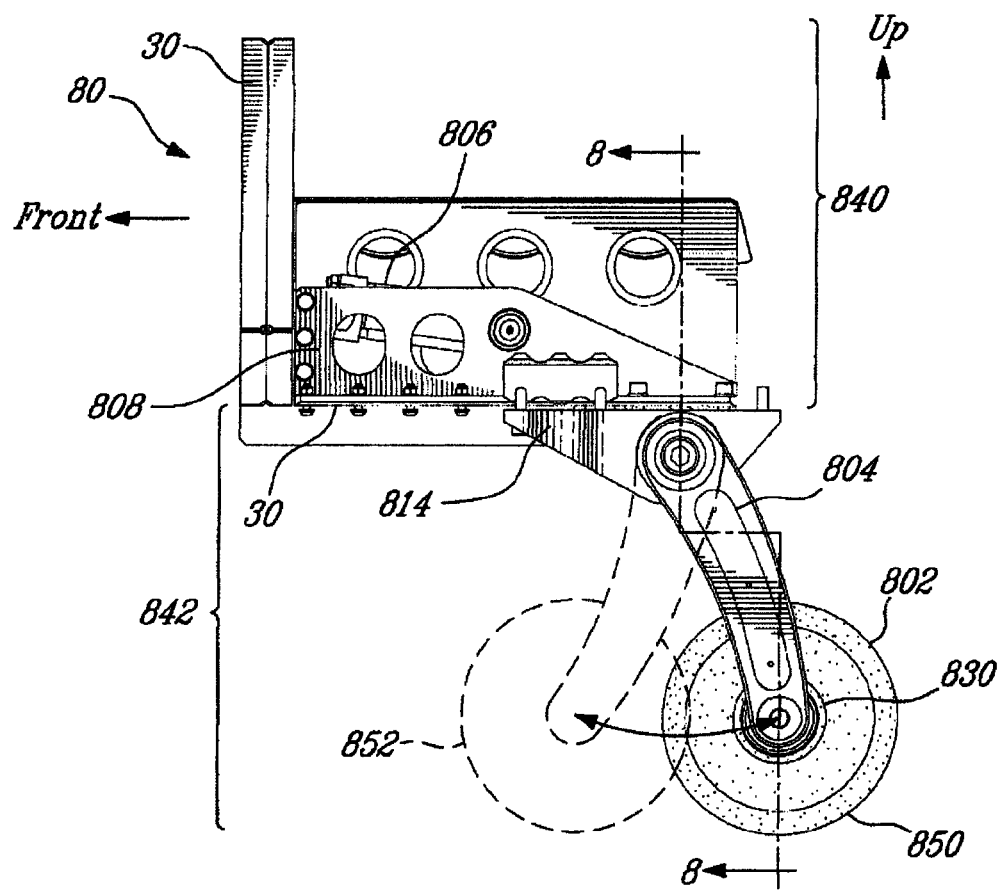
FIG. 7 is a side elevation view of the tensioner system of FIG. 3.
Figure 8:
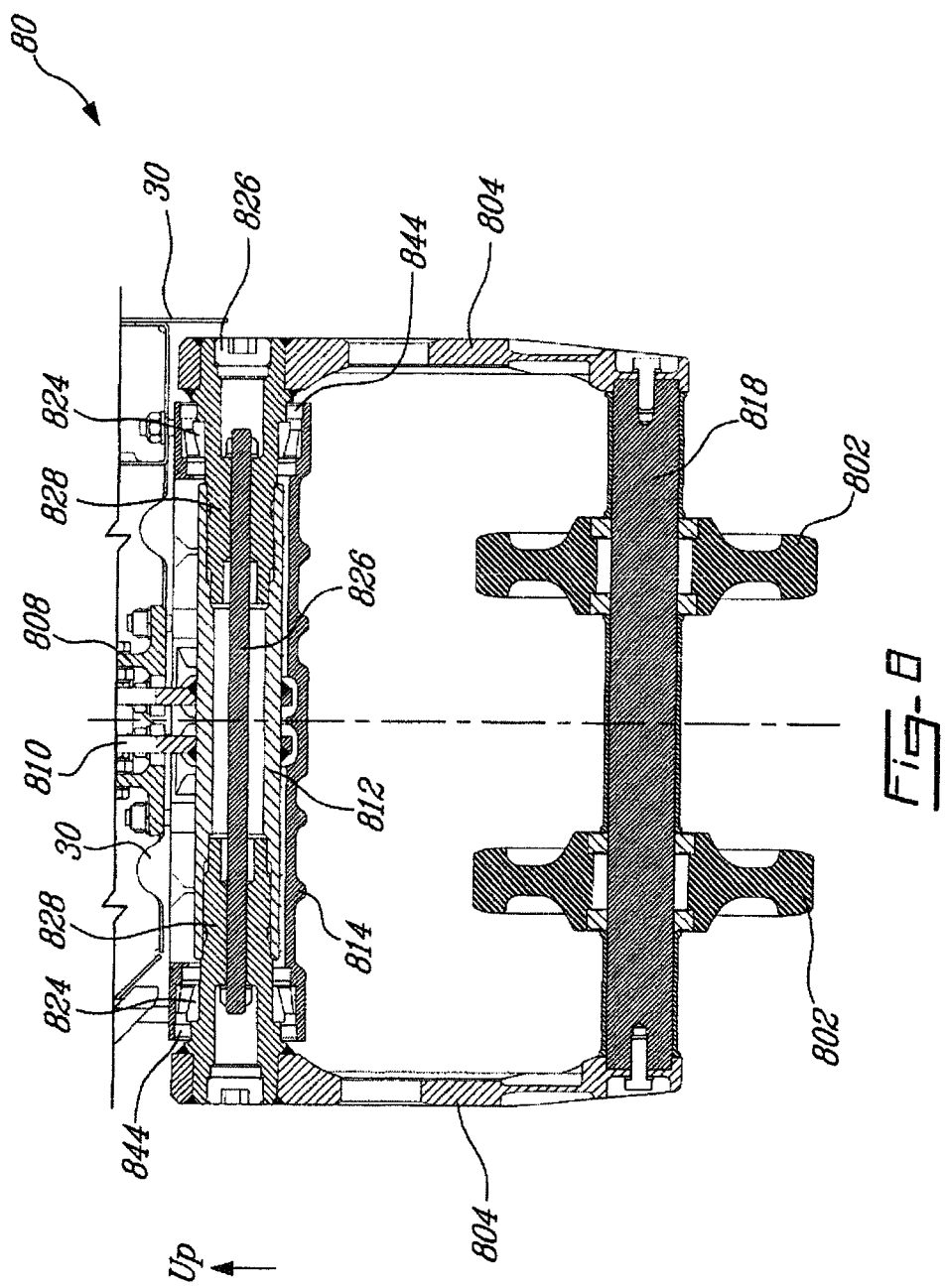
FIG. 8 is a transversal cross-sectional view of the tensioner system of FIG. 7.
Figure 9:
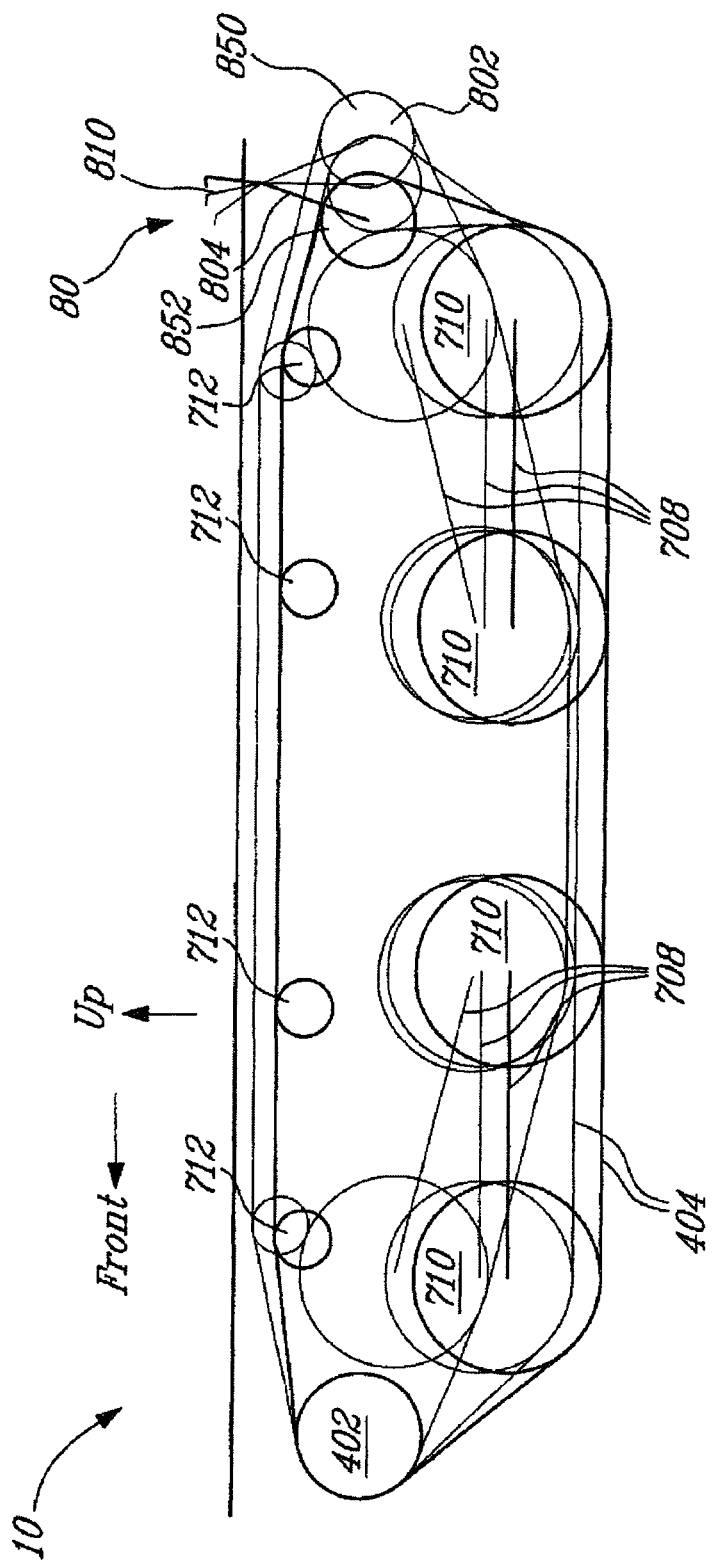
FIG. 9 is a schematic side elevation view of the tensioner system of FIG. 3 and its effect on the endless belt of FIG. 1.

Focusing now on FIG. 7 illustrating the limit positions 850 and 852 of the endless belt contacting wheels 802, the tensioner system 80 tenses the endless belt 404 to the maximum in its extended limit position 850. In contrast, the tensioner system 80, in the retracted limit position 852, removes tension in the endless belt 404. A schematic illustration of an exemplary displacement of the endless belt 404 in accordance with the limit positions 850 and 852 of the endless belt contacting wheels 802 is provided in FIG. 9. It has to be noted that, with the embodied geometry, for a constant hydraulic pressure, the force applied by the endless belt contacting wheels 802 on the endless belt 404 remains substantially constant over the entire course of the levers 804. This is that the effective lever of the primary lever 810 and the effective lever of the levers 804 remains substantially proportional over the entire course of the levers 804.

As mentioned above, one of the objects of the present invention is to provide sufficient tension in the endless belt 404 to avoid the endless belt 404 from any slipperage or coming off with respect to the sprocket 402. It also prevents the endless belt 404 from coming off the weight supporting wheels 710 and the support wheels 712. Significant tension in the endless belt 404 could be maintained so that no slipperage of the endless belt 404 occurs when driven by the sprocket 402. However, the down side is that unnecessary tension in the endless belt 404 prevents the suspension system 70 of the vehicle from working in an optimal fashion. In other words, maximum suspension travel can occur if there is sufficient slack in the endless belt 404 to allow the suspension system 70 to move. Unnecessary tension in the endless belt 404 restricts movements of the suspension system 70 required to provide a smooth ride.

A strategy to avoid any slipperage of the sprocket 402 with the endless belt 404 while allowing maximum suspension travel suggests that tension in the endless belt 404 should be adapted to specific conditions of use of the vehicle 10, namely, inter alia, the drive effort to propel the vehicle 10, the speed of the vehicle 10, the centrifugal force of the turning endless belt 404, vehicle self-pivoting (aka autogiration when each endless belt 404 counter-rotate), the steering angle, the longitudinal angle of the vehicle 10 and the transversal angle of the vehicle 10.

Figure 13:
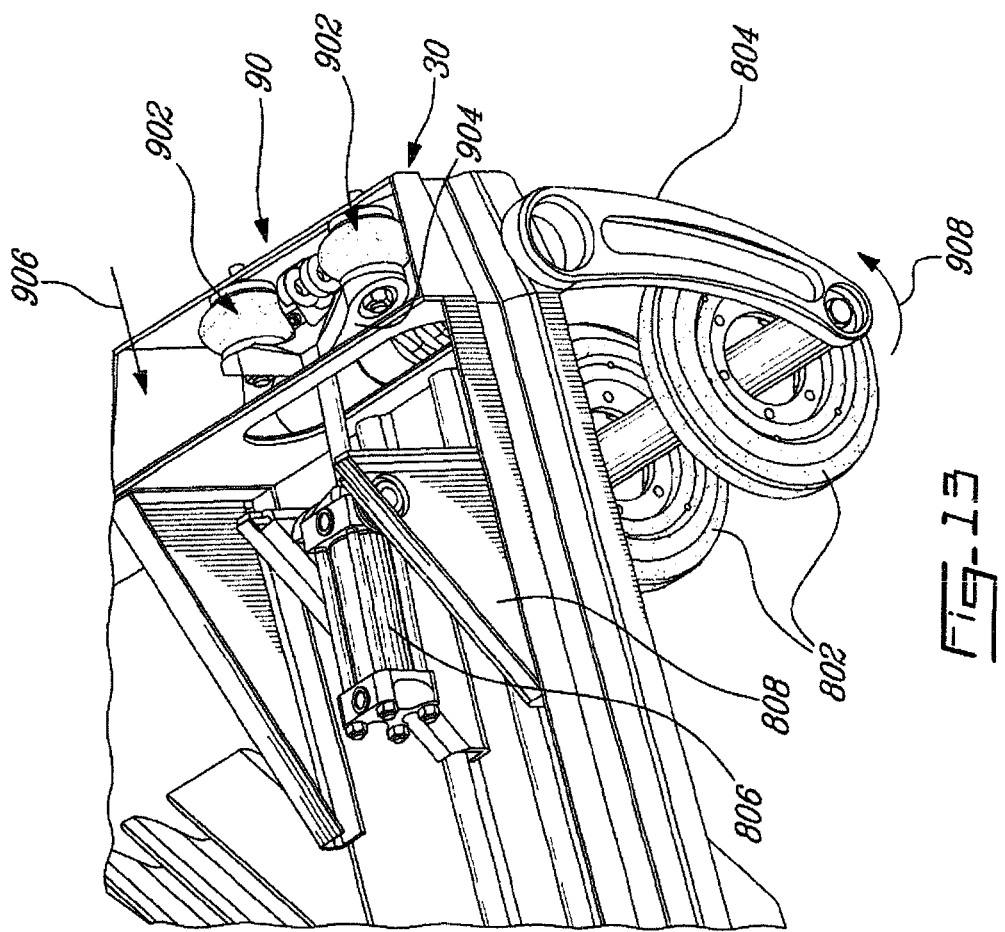
FIG. 13 is an angled view of part of a variant all-terrain vehicle, showing the tensioner system of FIG. 3 provided with a spring mechanism.

The drive effort to propel the vehicle 10 is provided by the hydraulic system 60. By using corresponding hydraulic pressure in the hydraulic system 60 used to drive the sprocket 402 tensioner system 80 it is possible to obtain a correlation between the drive effort provided by the sprocket 402 and tension of the endless belt 404. Increased hydraulic pressure in the drive system caused by increased drive effort increases the tension in the endless belt 404 therefore preventing slipperage of the sprocket 402. In contrast, reduction of the drive effort reduces the hydraulic pressure in the hydraulic system 60, which also reduces the tension in the endless belt 404. The correlation is dynamic and provides corresponding tension in the endless belt 404 at all time. A spring (as seen in FIG. 13, described hereinbelow) is alternatively added to the tensioner system 80 to preload the endless belt 404 and provide minimum tension when the hydraulic pressure in the hydraulic system 60 is under a predetermined threshold.

Figure 10:
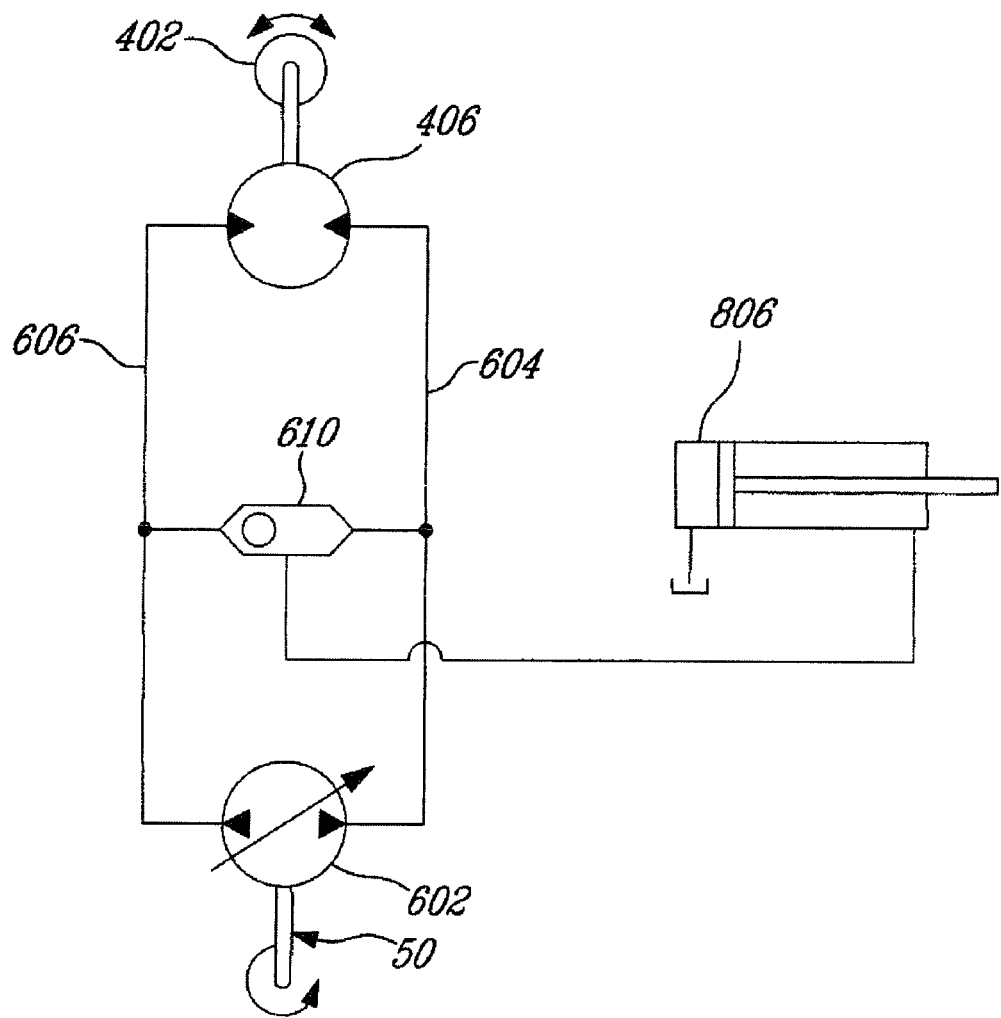
FIG. 10 is a schematic hydraulic circuit illustrating an embodiment of the present invention.

FIG. 10 schematically illustrates a possible embodiment that provides a correlation between the drive hydraulic pressure and the tension in the endless belt 404. The hydraulic layout of FIG. 10 illustrates a power pack 50 that actuates the hydraulic pump 602 to hydraulically power the hydraulic motor 406 which, in turn, rotates the sprocket 402 that is engaged to the endless belt 404 to propel the vehicle 10. The hydraulic cylinder 806 of the tensioner mechanism 80 is hydraulically connected to the hydraulic circuit powering the hydraulic motor 406. This way, the hydraulic cylinder 806 and the hydraulic motor 406 are subjected to identical hydraulic pressure. This means the hydraulic cylinder 806 applies more tension to the endless belt 404 when more drive efforts are provided to the sprocket 402.

Still on FIG. 10, the forward path 604 of hydraulic oil brings hydraulic power to the hydraulic motor 406 when the vehicle 10 is propelled forward. Conversely, a rearward path 606 of hydraulic oil brings hydraulic power to the hydraulic motor 406 when the vehicle 10 is propelled rearward. The hydraulic cylinder 806 is hydraulically powered from both paths 604, 606 of hydraulic oil to tense the endless belt 404 when the vehicle 10 is driven in both forward and rearward directions. A shuttle valve 610 is provided between both paths 604 and 606 of hydraulic oil to ensure that the hydraulic cylinder 806 is pressurized by the path 604, 606 providing the highest hydraulic pressure whether the vehicle 10 is driven forward or rearward. Additional information about an exemplary shuttle valve 610 suitable to be used in the present embodiment is available at Annex 1 and incorporated herein by reference.

Figure 11:
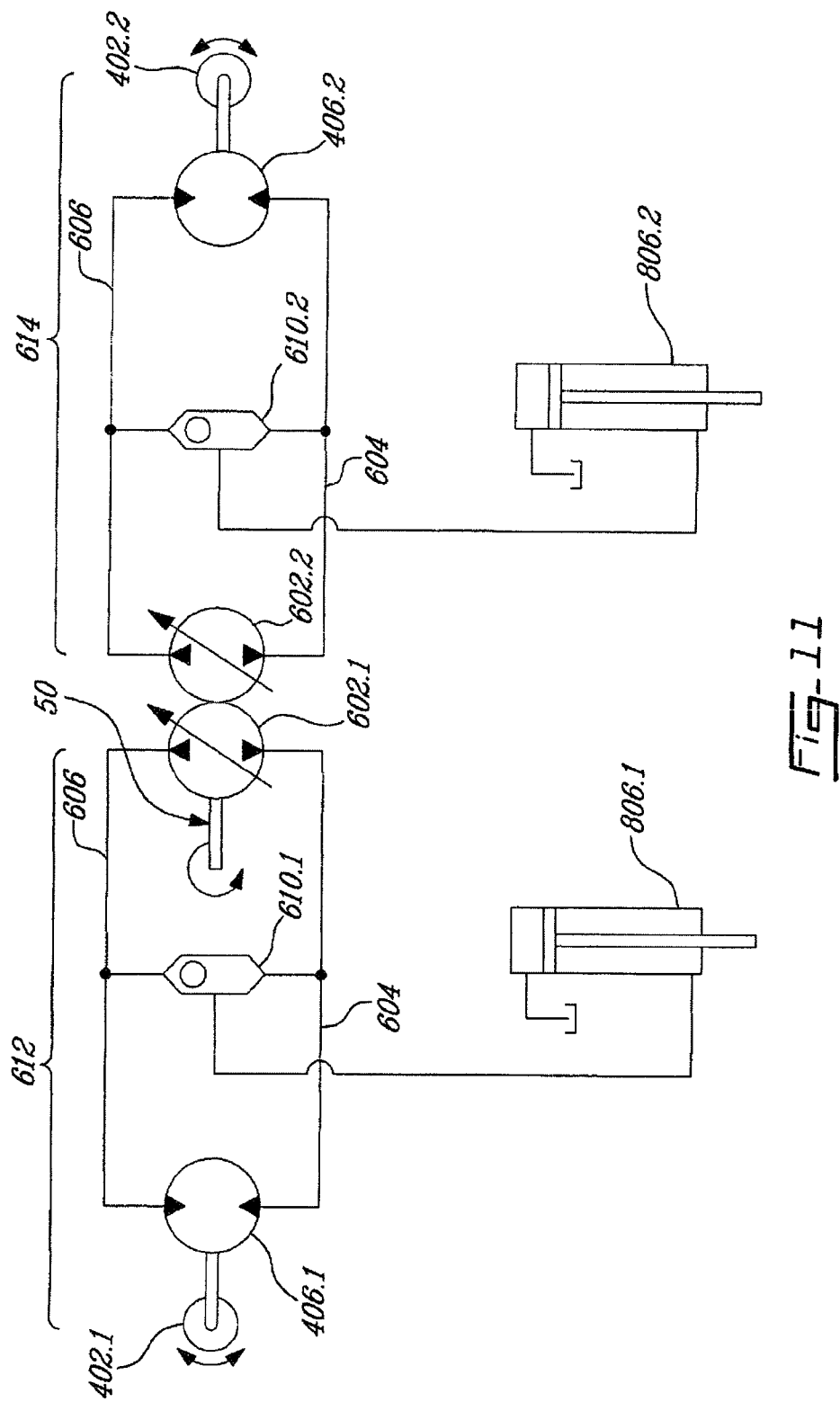
FIG. 11 is a schematic hydraulic circuit illustrating an embodiment of the present invention.

FIG. 11 illustrates a hydraulic layout having two distinct hydraulic circuits, i.e. one hydraulic circuit 612 for driving the endless belt 404 disposed on the left side of the vehicle 10 and another 614 for the endless belt 404 disposed on the right side of the vehicle 10. Each hydraulic circuit 612, 614 is pressurized by the same power source 50 (although more than one power source 50 could be used without departing from the scope of the present invention) activating distinct hydraulic pumps 602.1 and 602.2. One hydraulic pump for each hydraulic circuit 612, 614 ensures that enough hydraulic pressure is provided to each hydraulic motor 406.1, 406.2. The quantity and the pressure of hydraulic fluid in each hydraulic circuit 612, 614 varies in accordance with the drive effort (hydraulic fluid pressure), the speed of the vehicle 10 (hydraulic fluid velocity), the load of the vehicle 10 and, inter alia, the steering angle if the vehicle 10 turns. Shuttle valves 610.1 and 610.2 are provided in each hydraulic circuit 612 and 614 between the hydraulic lines 604, 606 to achieve the same purpose as described above in respect to FIG. 10. Therefore, each hydraulic cylinder 806 will be respectively actuated by the hydraulic circuit 612 or 614 that drives its associated endless belt 404. Moreover, the highest hydraulic pressure will still be used by each hydraulic path 604, 606 when the endless belts 404 moves either forwardly or rearwardly.

Figure 12:
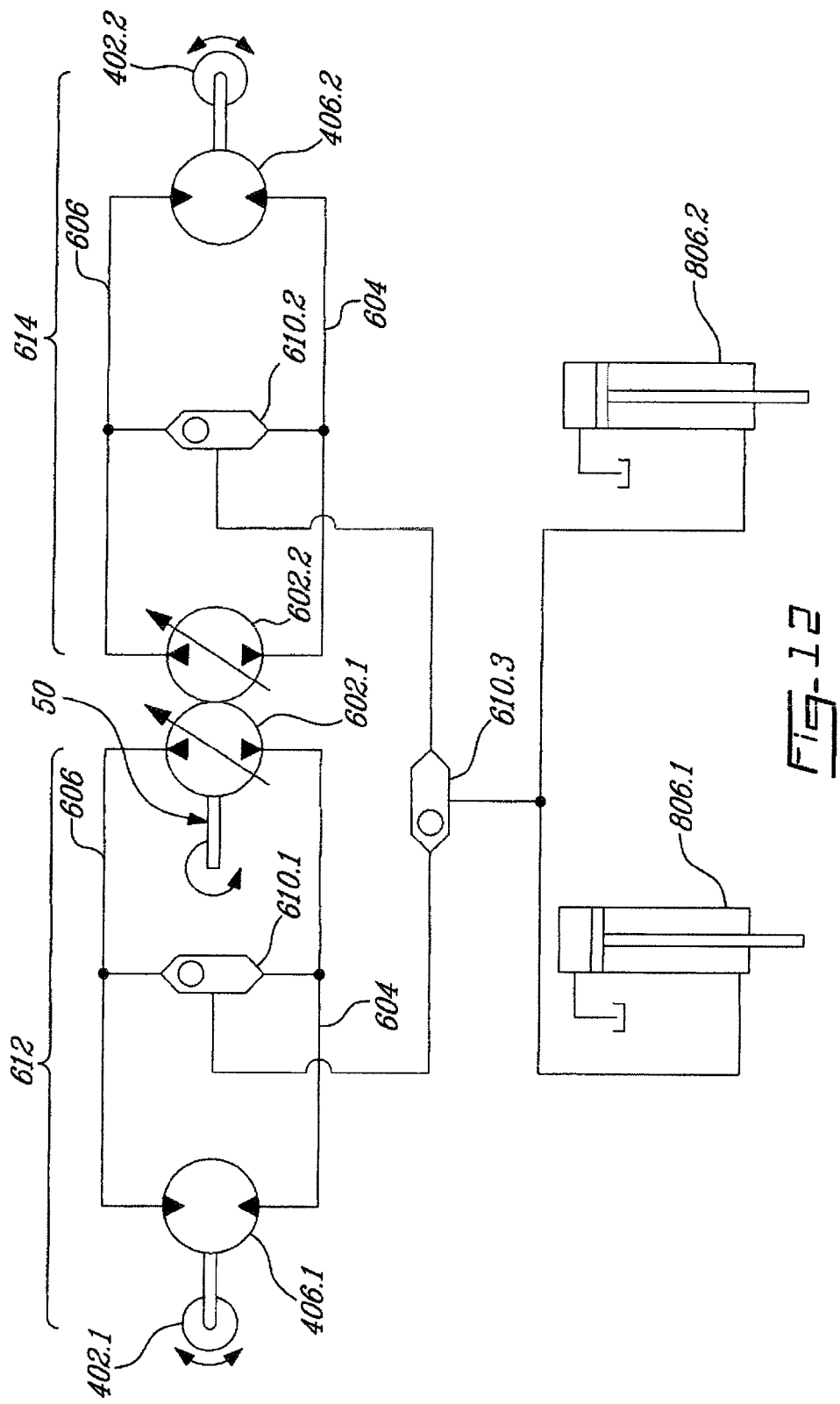
FIG. 12 is a schematic hydraulic circuit illustrating an embodiment of the present invention.

Referring now to FIG. 12 illustrating the hydraulic system of FIG. 11 with an additional shuttle valve 610.3. The shuttle valve 610.3 is provided between both hydraulic circuits 612, 614 to equally use the absolute highest hydraulic pressure simultaneously on both hydraulic cylinders 806.1, 806.2.

Annex 2, enclosed herein and incorporated by reference, provides technical information about a hydraulic proportional pressure reducing valve that can optionally be used in the hydraulic system of the vehicle 10. The proportional valve can alternately be used to replace the shuttle valve 610 and provide only the desired amount of pressure to each hydraulic cylinder 806. The proportional valve is adapted to receive an electric signal about a desired output pressure, if the output pressure is different than the electric signal the proportional valve adjusts the output pressure until it reaches the desired output pressure. Alternatively, a pilot pressure could be used by the proportional valve to determine the amount of pressure that reaches each hydraulic cylinder 806 through the hydraulic proportional valve. The pilot pressure can be managed by controllers adapted to manage hydraulic systems as exemplified in Annex 3a and Annex 3b, both incorporated herein by reference.

With reference to FIG. 13, a spring mechanism 90 has been added to each above-described tensioner system 80 to ensure a minimum tension on the endless belt 404 during operation and non operation. The spring mechanism 90 herein includes a pair pneumatic springs 902, which are compressed between the frame 30 and a component 904 (for instance, the piston end of the hydraulic cylinder 806) that is connected to the mechanism that cause the tension levers 804 to pivot. Therefore, the springs 902 exert pressure in direction 906 onto the component 904, which in turn forces the tension levers 804 along direction 908 thereby biasing the contacting wheels 802 against the endless belt 404. The spring mechanism 90 is thus exemplarily herein coupled with the hydraulic cylinder 806 through the rod end 822 secured to the primary lever 810. Other types of springs can be used instead of the present pneumatic springs 902.

Figure 14:
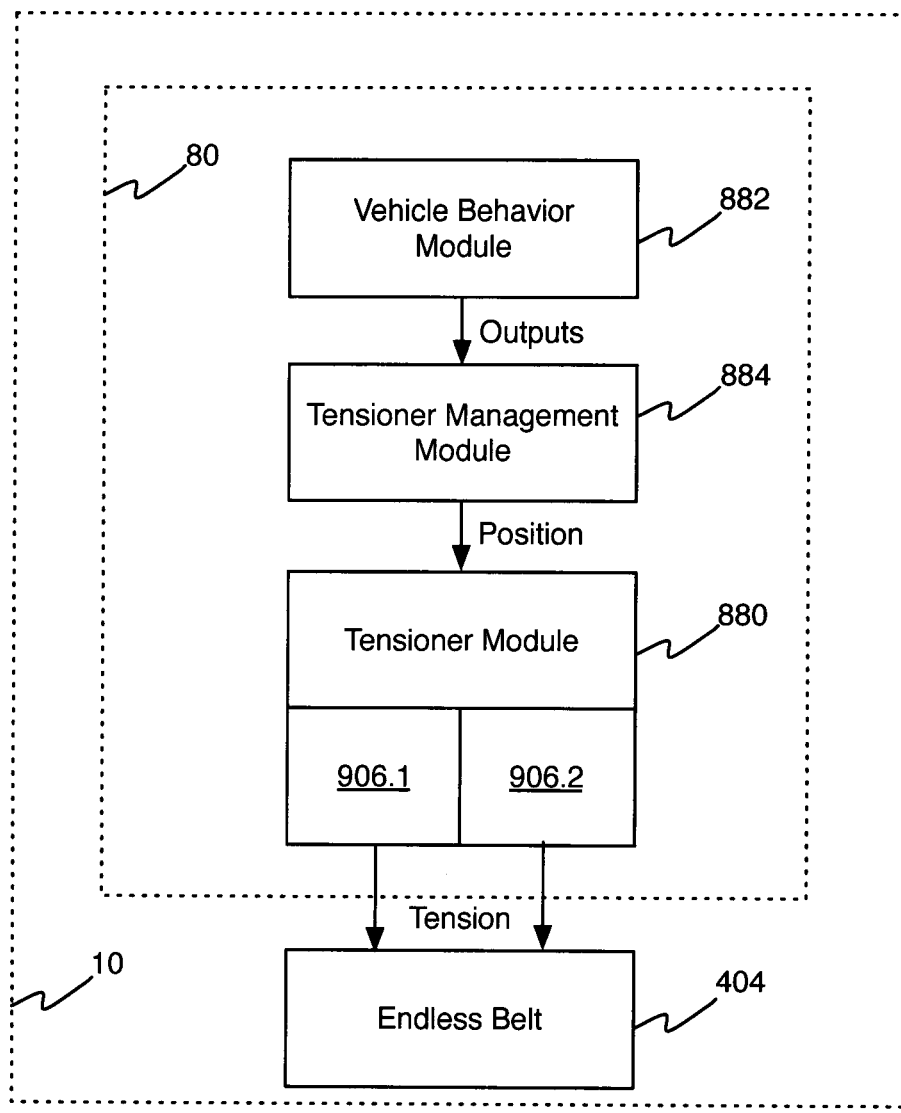
FIG. 14 is a schematic tensioner system comprising three modules, illustrating an embodiment of the present invention.

FIG. 14 illustrates a tensioner system comprising three modules. The tensioner system 80 of FIG. 14 is a constituent of a vehicle 10, as illustrated in FIG. 1 and FIG. 2. The vehicle 10 further includes at least one endless belt 404, as illustrated in FIG. 1 and FIG. 2. The tensioner system 80 of FIG. 14 comprises a vehicle behavior module 882, a tensioner management module 884, and a tensioner module 880. The vehicle behavior module 882 determines the behaviors of the vehicle 10. The tensioner management module 884 positions the tensioner module 880, based, at least in part, on outputs provided by the vehicle behavior module 882. And the tensioner module 880 physically applies tension on the endless belt 404.

The description and the drawings that are presented herein are meant to be illustrative of the present invention. They are not meant to be limiting of the scope of the present invention. Modifications to the embodiments described may be made without departing from the present invention, the scope of which is defined by the following claims:

What is claimed is:

1. An endless belt tensioner system comprising:
   a tensioner module adapted to physically apply tension to an endless belt of a vehicle; and
   a tensioner management module adapted to manage the tensioner module,
   wherein the endless belt tensioner system dynamically manages the tension in the endless belt to allow appropriate suspension movement and to prevent the endless belt to disengage from an operating configuration when the suspension is actuated.

2. The endless belt of claim 1, wherein the tension in the endless belt is based at least in part on the speed of the vehicle.

3. The endless belt of claim 1, wherein the tensioner module includes an hydraulic cylinder actuatable to manage the tension in the endless belt, the hydraulic cylinder being adapted to be operatively located outside a periphery of the endless belt.

4. The endless belt of claim 3, wherein the tensioner module includes at least one lever operatively connected between the hydraulic cylinder and at least one endless belt contacting wheel adapted to be operatively disposed within the periphery of the endless belt.

5. The endless belt of claim 1, wherein the tensioner module is adapted to individually manage tension in two separate endless belts operatively suspending the vehicle.

6. The endless belt of claim 1, wherein, when the endless belt tensioner system is installed on a vehicle, the tension in the endless belt is adapted to be substantially proportional to an endless belt drive force propelling the vehicle.

7. The endless belt of claim 1, wherein, when the endless belt tensioner system is installed on the vehicle, the tension in the endless belt is adapted to be managed by the tensioner module when the vehicle moves forward and when the vehicle moves rearward.

8. A vehicle including an endless belt tensioner system, the endless belt tensioner system comprising:
   a tensioner module adapted to physically apply tension to an endless belt of a vehicle; and
   a tensioner management module adapted to manage the tensioner module,
   wherein the endless belt tensioner system dynamically manages the tension in the endless belt to allow appropriate suspension movement and to prevent the endless belt to disengage from an operating configuration when the suspension is actuated.

9. The vehicle of claim 8, wherein the tension in the endless belt is based at least in part on the speed of the vehicle.

10. The vehicle of claim 8, wherein the tensioner module includes a hydraulic cylinder actuatable to manage the tension in the endless belt, the hydraulic cylinder being adapted to be operatively located outside a periphery of the endless belt.

11. The vehicle of claim 10, wherein the tensioner module includes at least one lever operatively connected between the hydraulic cylinder and at least one endless belt contacting wheel adapted to be operatively disposed within the periphery of the endless belt.

12. The vehicle of claim 8, wherein the tensioner module is adapted to individually manage tension in two separate endless belts operatively suspending the vehicle.

13. The vehicle of claim 8, wherein, when the endless belt tensioner system is installed on a vehicle, the tension in the endless belt is adapted to be substantially proportional to an endless belt drive force propelling the vehicle.

14. The vehicle of claim 8, wherein, when the endless belt tensioner system is installed on a vehicle, the tension in the endless belt is adapted to be managed by the tensioner module when the vehicle moves forward and when the vehicle moves rearward.

15. A method of managing a ground-contacting endless belt tension installed on a vehicle, the method comprising:
   sensing a vehicle behavior; and
   dynamically adjusting the tension in the ground-contacting endless belt based, at least in part, on the sensed vehicle behavior while allowing sufficient slack in the endless belt so as to allow appropriate suspension movement and to prevent disengagement of the endless belt from its operating configuration on the vehicle.

16. The method of claim 15 wherein the appropriate suspension movement corresponds to allowing maximum suspension travel.

17. The method of claim 15, wherein adjusting tension in the ground-contacting endless belt is made on a basis of an actuation of a hydraulic cylinder disposed outside a periphery of the ground-contacting endless belt.

18. The method of claim 17, wherein the actuation of the hydraulic cylinder further actuates at least one lever operatively connected between the hydraulic cylinder and at least one endless belt contacting wheel adapted to be operatively disposed within the periphery of the endless belt.

19. The method of claim 17, further sensing a drive direction of the vehicle.

20. The method of claim 17, further separately adjusting the tension in a plurality of ground-contacting endless belts on the vehicle.

* * * * *